Aug. 28, 1956  C. L. HORNBERGER  2,760,734
SPEED REGULATOR
Filed Aug. 10, 1953  3 Sheets-Sheet 2

INVENTOR
CLARENCE L. HORNBERGER

ATTORNEY

Aug. 28, 1956  C. L. HORNBERGER  2,760,734
SPEED REGULATOR

Filed Aug. 10, 1953  3 Sheets-Sheet 3

INVENTOR
CLARENCE L. HORNBERGER

ATTORNEY

United States Patent Office 2,760,734
Patented Aug. 28, 1956

2,760,734

SPEED REGULATOR

Clarence L. Hornberger, Manheim Township, Lancaster County, Pa., assignor to Armstrong Cork Company, Lancaster, Pa., a corporation of Pennsylvania Application August 10, 1953, Serial No. 373,126

6 Claims. (Cl. 242—75)

This invention relates to a speed regulator, and more particularly to a device for controlling the speed of a roll-up machine so that the rate of rotation of the roll will decrease as the roll increases in size.

In the processing of sheet material such as floor and wall covering, it is customary to take the material from a processing machine and form a roll on a conventional roll-up device. General practice has been to form a festoon of the sheet material between the processing operation and the roll-up device. This is particularly desirable in instances where the continuous sheet of material leaves the manufacturing operation intermittently and the roll-up device is operated continuously. If the speed of rotation is not decreased as the roll increases in size, the tension placed on the sheet material becomes too great and torn material results.

Several systems have been devised in the past to relieve the situation outlined above. One of the most common of these systems has been to place a dancer roll in the festoon and have the dancer roll strike a stop switch at the top of the festoon to break the electric circuit to the motor of the wind-up device, stopping the same until the festoon is formed again. This has resulted in a diminishing of the amount of scrap resulting from torn material; however, it is not practical to completely stop the roll-up operation each time the supply of material becomes inadequate to keep the device operating at full speed.

The present invention overcomes these disadvantages by providing a system for controlling the speed of the motor or other driving mechanism on the roll-up device during a certain portion of vertical travel of the dancer roll in the festoon. During the major portion of the path of travel of the dancer roll, the speed regulator is in full open position and the motor is allowed to operate at full speed; however, when the dancer roll is located anywhere within a limited zone at the top of the path of travel of the dancer roll, the position of the dancer roll will determine the proper speed regulator setting, and any movement of the dancer roll, either upwardly or downwardly, will change the speed regulator setting and consequently control the speed of the roll-up device. While in this limited zone, if the dancer roll moves upwardly because of a shortened festoon, the regulator will decrease the speed of the roll-up device; and, if the dancer roll moves down, the regulator will increase the speed of the roll-up device. If the dancer roll reaches the top limit of its permitted path of travel, the regulator will be completely closed and the roll-up device will be stopped. As the material is fed into the festoon, the festoon will lengthen, and when the dancer roll reaches the lower extremity of this limited zone, the regulator will be fully open and the roll-up device will operate at full speed.

An object of this invention is to provide a speed regulator which will be effective during only a portion of the time that the roll-up device is in operation to reduce the speed of the device as the dancer roll approaches the top of its path of travel and the festoon approaches minimum size.

Another object of this invention is to provide a speed regulator for controlling the speed of conveying a continuous sheet of material from one processing operation to the other to prevent placing unnecessary tension on the material which might damage the same.

In order that my invention may be more readily understood, it will be described in connection with the attached drawings, in which.

Figure 1:
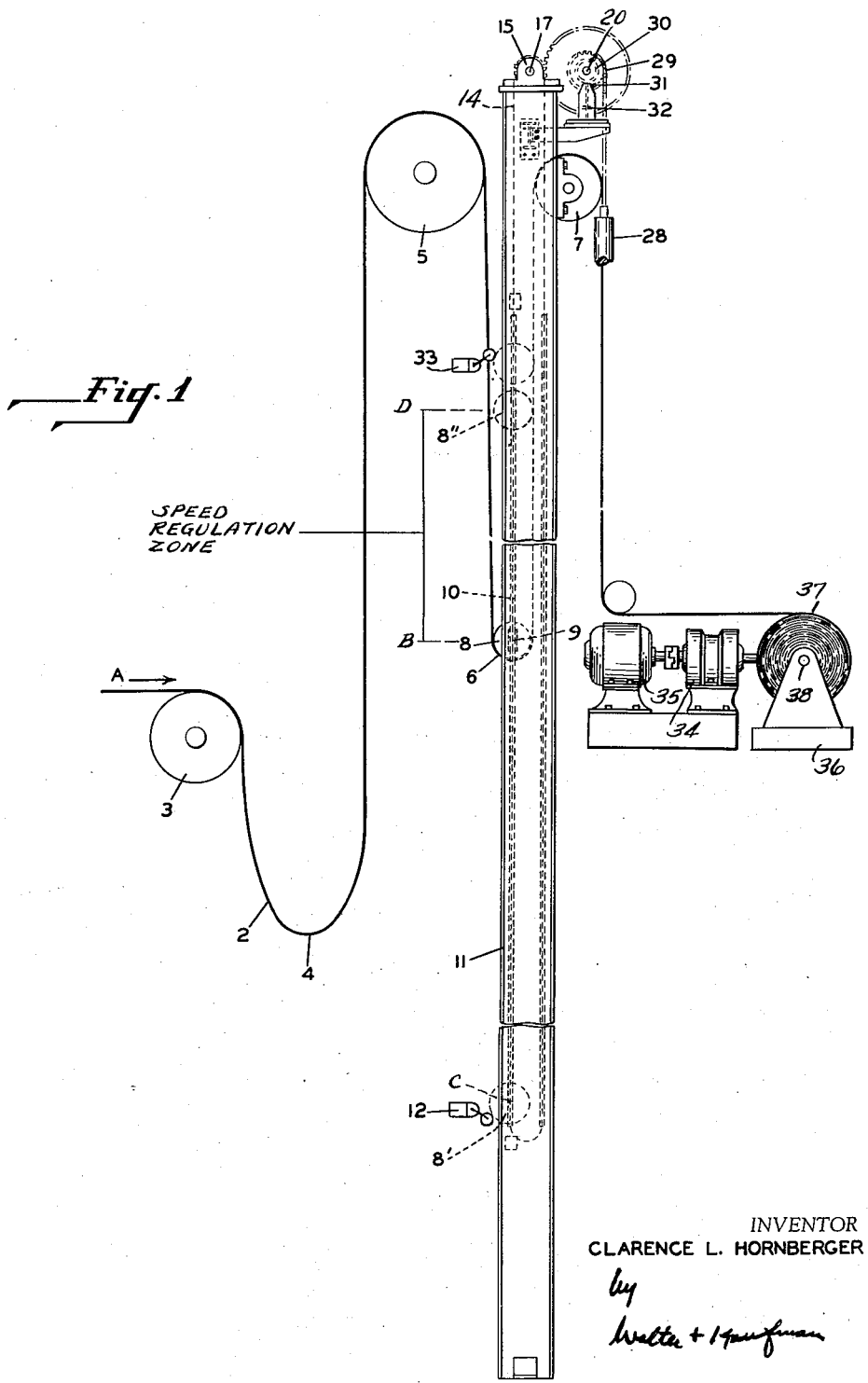
Figure 1 is a side elevational view showing a portion of a manufacturing operation.

Referring to Figure 1, there is shown a continuous web of sheet material designated by the numeral 2 which is moving in the direction of the arrow A. This material is coming from a manufacturing operation, not shown, such as a conventional block printing machine of the type used in the manufacture of floor and wall coverings. As the sheet material enters the device, it passes over an idler roll 3 and forms a dip 4, after which the material passes over a pull roll 5 and then forms into a festoon 6, after which it passes over an idler roll 7 and goes on to a roll-up device. As shown in Figure 1, the roll-up device includes a variable speed drive 34, driven by an electric motor 35, and a roll-up stand 36. A roll 37 is formed as the web 2 is rolled up on a spindle 38.

Positioned in the festoon 6 is a dancer member in the form of a roll 8 which is journaled in sliding bearings 9 (Figure 2) which slide in a vertical direction along tracks 10 mounted on each side of the machine in vertical supports 11. The dancer roll 8 is shown in solid lines in one position (position B) in Figure 1 and is shown in dotted lines in several other positions. In its lowermost position it is designated by the numeral 8' and in its uppermost control position it is designated by the numeral 8". When the dancer roll is located at any point between position B and position C, the roll-up device operates at maximum speed, inasmuch as the speed regulator is in full open position. This arrangement is provided because the festoon is then of sufficient extent to supply the material necessary to keep the roll-up device operating at full speed. If, however, the dancer roll reaches position C, it strikes a switch 12 which breaks the electric circuit to the motor on the preceding manufacturing operation, which halts the feeding of sheet material to the festoon. As the dancer roll moves upward from position C, the roll-up device is operating at maximum speed until the dancer roll reaches position B. At this point the speed regulator is still open full but the dancer roll is at the lower extremity of the zone in which it controls the speed regulator setting.

Figure 2:
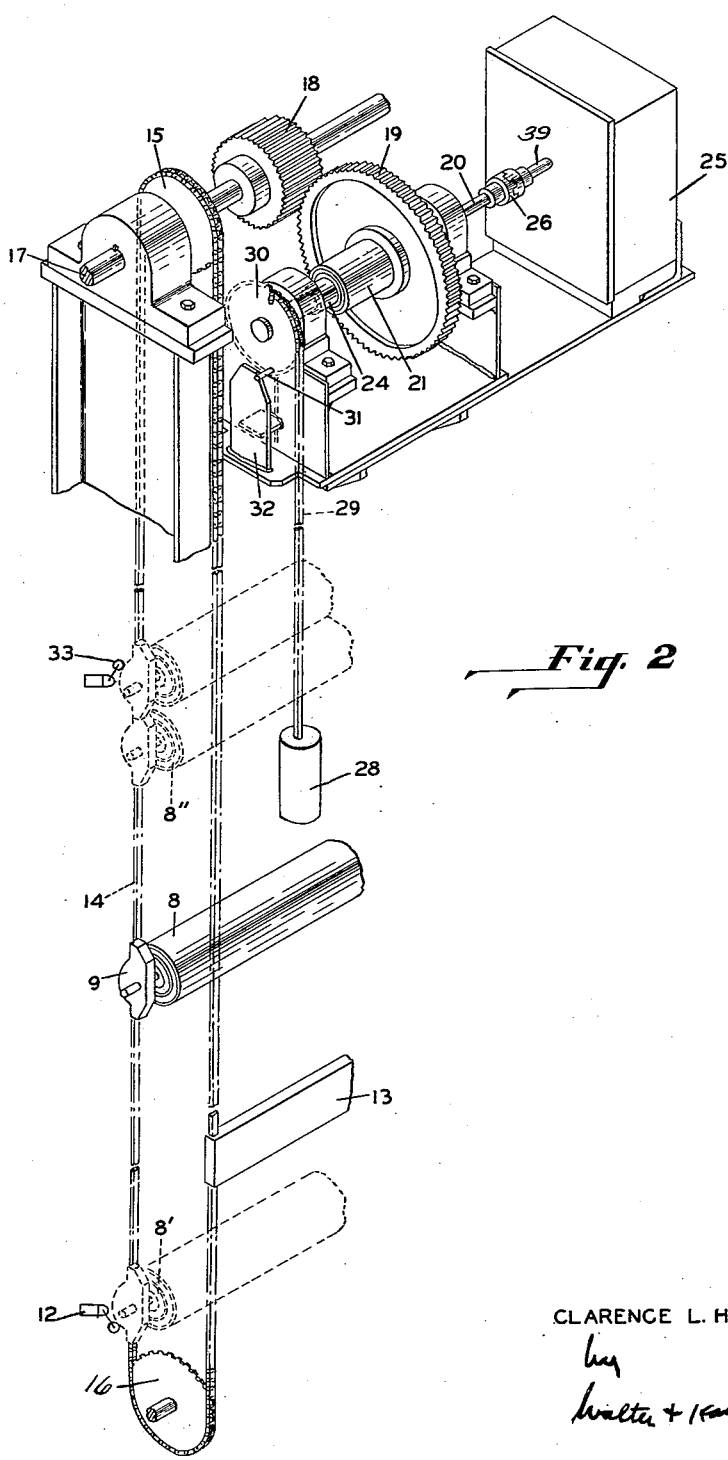
Figure 2 is a perspective view of the mechanism for operating the speed regulator.

Referring now to Figure 2, it will be observed that the bearing 9 in which the dancer roll 8 is journaled is attached to a chain 14 which travels over a sprocket 15 at the top of the device and a sprocket 16 at the bottom of the device. This chain 14 is preferably provided with a counterweight 13 so that the dancer roll 8 is not fully supported by the festoon of sheet material. The weight relationship between counterweight 13 and dancer roll 8 should be such that the dancer roll exerts sufficient weight on the festoon to keep the sheet material under slight tension. Sprocket 15 is keyed to a shaft 17, to which shaft is also keyed a gear 18. It will be seen from this arrangement that as the dancer roll 8 is moved in a vertical direction, gear 18 is rotated by the chain 14, the sprocket 15, and the shaft 17. A second gear 19 is in mesh with gear 18 and is mounted for rotation on shaft 20.

Figure 3:
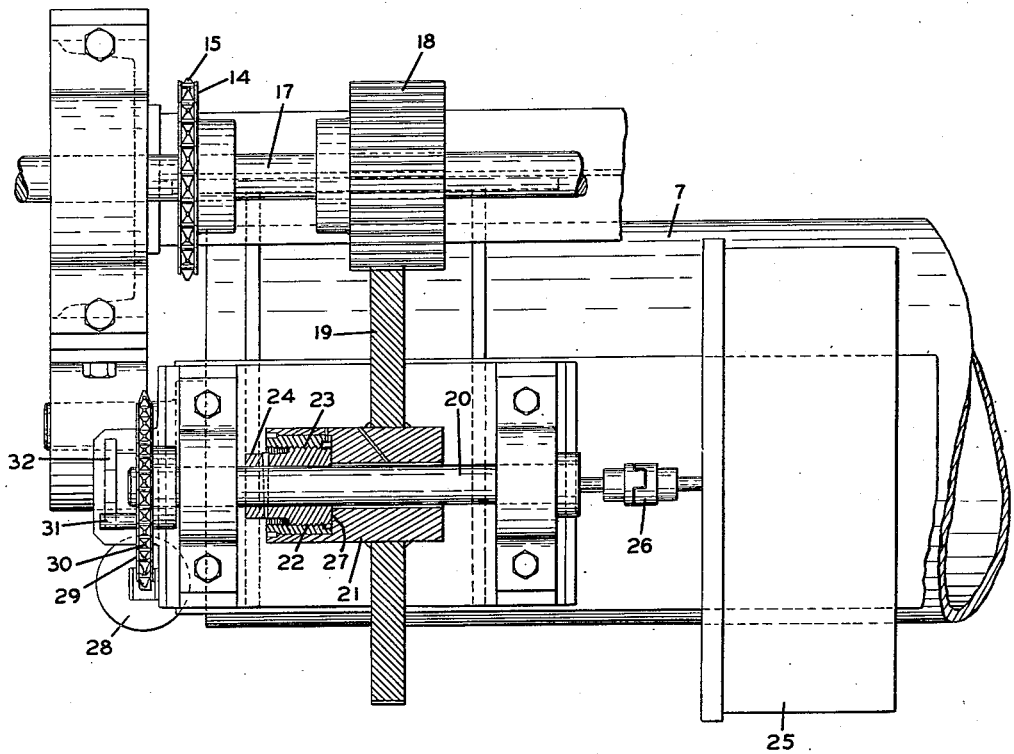
Figure 3 is a detailed view of the mechanism for operating the device.

Referring to Figure 3, it will be observed that gear 19 is provided with a hub 21 which receives an internally threaded sleeve 22. This internally threaded sleeve 22 on the hub 21 engages a thread 23 on an externally threaded sleeve 24 pinned to the shaft 20. A potentiometer or other speed regulator is shown diagrammatically at 25 and the shaft 20 is connected to the potentiometer by a coupling 26 so that any rotation of the shaft 20 will rotate potentiometer shaft 39 and change the setting of the potentiometer.

The pitch of the thread 23 on the sleeve 24 and the pitch of the internal thread 22 on the hub 21 of gear 19 should be the same and of such pitch and length that the gear 19 will rotate on the sleeve 24 while the dancer roll 8 is moving from position B to position C. During this downward path of travel of the dancer roll 8 the gear 19 will be unscrewing from the sleeve 24 but will not completely unscrew itself therefrom. As the dancer roll is moving upwardly, the gear 19 will screw itself on the sleeve 24 and will assume the position shown in Figure 3 when the dancer roll is at position B. As the gear 19 is being unscrewed from the sleeve 24, the gear 19 moves axially along shaft 20 from left to right, as viewed in Figure 3. When the gear is being screwed onto the sleeve, the gear 19 moves from right to left. In order that gear 19 will always mesh with gear 18, gear 18 is provided with a wide face to accommodate the traverse of the gear 19. Any additional upward movement of the dancer roll 8 beyond point B will cause gear 19 to rotate the shaft 20 inasmuch as the inner surface 27 of the sleeve 24 will be in abutting engagement with the bottom wall of the recess in the hub 21 of the gear 19. Therefore, when gear 19 and sleeve 24 are in this relative position, any rotation of gear 19 in a counterclockwise direction rotates shaft 20. Since the potentiometer 25 is directly connected to shaft 20 through the potentiometer shaft 39 and coupling 26, any such rotation of shaft 20 caused by vertical movement of the dancer roll 8 above position B rotates the potentiometer shaft 39 and changes the setting of the potentiometer.

As dancer roll 8 moves from its position at B in an upward direction toward position D, the gear 19 will move the shaft 20 in a counterclockwise direction. The ratio of the gear 18 and the gear 19 is such that as the dancer roll 8 is moving from position B to position D, the gear 19 will rotate through an arc of about 300°, which is the limit of the range of the potentiometer.

During the time that the dancer roll 8 is operating between position B and C and the potentiometer is in fully open position, shaft 20 is held from rotation by means of a counterweight 28 attached to a chain 29 which is in engagement with sprocket 30 keyed to shaft 20. Sprocket 30 is provided with a pin 31 which engages a stop 32. The counterweight 28 holds the pin 31 in engagement with the stop 32 to insure that the potentiometer is in fully open position. In order to insure that the potentiometer will be held in fully open position, it is necessary that the drag between the threaded members 22 and 23 be less than the force exerted by the counterweight 28. This prevents any upward movement of the dancer roll 8 while it is below position B from rotating the potentiometer shaft. When the gear 19 is screwed onto the sleeve 24 and the dancer roll is in position B, rotation of the gear 19 in a counterclockwise direction by the dancer roll 8 moving toward position D will rotate the shaft 20 and the sprocket 30, moving the pin 31 away from the stop 32. As the shaft 20 rotates in a counterclockwise direction, the potentiometer will decrease the speed of the roll-up device. When the dancer roll 8 reaches position D, the potentiometer will have gone through its range and will stop the roll-up device. This condition will continue until sufficient material is fed from the preceding operation to form a festoon and the dancer roll will then drop, in which event gear 18 will rotate gear 19 in a clockwise direction, thereby permitting the counterweight 28 to rotate shaft 20, and the potentiometer will permit the motor to start again. The motor will increase its speed progressively while the dancer roll is moving from the position D to the position B, at which time the potentiometer will be fully open.

A safety switch 33 is provided immediately above uppermost control position D to prevent damage in the event the potentiometer should fail to stop the roll-up device when the dancer roll 8 reaches position D. If this occurs, any additional upward movement of the dancer roll will cause the member 9 to engage switch 33 (as shown in Fig. 2), which breaks the electric circuit to the roll-up device.

In the operation of the device, the continuous web of sheet material 2 is run through the device and rolled up on a conventional roll-up device. Between the pull roll 5 and the roll-up device, the sheet material is permitted to form a festoon. Dancer roll 8 journaled in bearings 9 attached to chain 14 rests in the festoon formed by the sheet material. As the roll-up device continues to operate, the roll of material 37 increases in diameter and consequently the surface speed of the roll increases (assuming the same to be driven at a constant speed), thereby pulling the material from the festoon faster than it is supplied to the festoon. Such action reduces the length of the festoon and lifts the dancer roll.

In the preferred embodiment here under consideration, the maximum travel of the dancer roll from the position C to the position D is approximately 46 feet. During the greater portion of the path of travel of the dancer roll, no harm will result from having the wind-up device operating at maximum speed; however, as the dancer roll moves upwardly, it reaches a critical point at which the speed of the roll-up device should be decreased to prevent damage to the material, and if the dancer roll reaches the top limit, namely position D, the roll-up device should be completely stopped. In order to allow the equipment to operate at full speed during the major portion of the travel of the dancer roll and yet progressively diminish the speed during this critical portion of the travel of the dancer roll, the potentiometer controlling the speed of the wind-up is not brought into play until the dancer roll is approximately 40 inches from position D. While the dancer roll is traveling upwardly from position C to position 8, the chain 14 rotates sprocket 15 keyed to shaft 17, which rotates gear 18 in mesh with gear 19. Gear 19 rotates freely on shaft 20, and by the arrangement illustrated in Figure 3, the gear merely will be screwed on to the sleeve 24 pinned to shaft 20. During the time that the dancer roll is moving between position C to position B, shaft 20 is prevented from rotating by means of the counterweight 28 hanging on chain 29 which engages sprocket 30. Sprocket 30 is keyed to shaft 20, and inasmuch as the drag between the threads on the sleeves 22 and 24 is less than the force exerted by the counterweight, the shaft 20 is held stationary. When the dancer roll reaches point B in its upward path of travel, gear 19 is completely screwed on to the sleeve 24 and any further upward movement of the dancer roll rotates shaft 20 through the gear 19 and the sleeve 24. Shaft 20 is coupled to the potentiometer shaft 39 and further upward travel of the dancer roll 8 toward position D changes the potentiometer setting until the roll reaches position D. At this point, the potentiometer is completely shut off, stopping the roll-up device. When the festoon again begins to form, the dancer roll 8 will start traveling downward from position D and gear 19 will rotate shaft 20 in a clockwise direction, the counterweight 28 holding the members 22 and 23 against relative rotation until the pin 31 strikes stop 32. This prevents further rotation of the shaft 20 in a clockwise direction, and when pin 31 is in engagement with stop 32 the potentiometer is in fully open position and the roll-up device is operating at maximum speed. Continued downward movement of the roll 8 has no effect on the potentiometer and the roll-up device will continue to operate at maximum speed when the dancer roll is in any location below position B.

The potentiometer 25 may operate directly on the motor driving the roll-up device or may operate on a variable speed drive 34 connecting the motor 35 with the roll-up device as shown in Figure 1.

Figure 4:
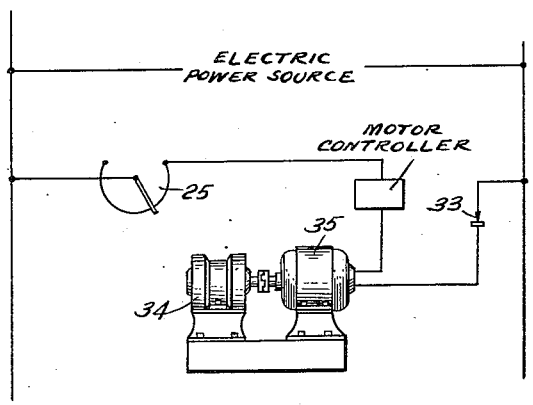
Figure 4 is a schematic wiring diagram of the electrical system for the speed regulator.

A schematic wiring diagram for the control unit is shown in Figure 4, and corresponding numbers have been applied to the various parts.

While the invention has been described in connection with a roll-up device, it will be understood that the same may be used to control the speed of processing operations arranged in tandem; for example, if the supply of material flowing from one processing operation to another processing operation is temporarily interrupted, this device may be used to decrease the speed of the succeeding processing operation until a sufficient supply of material is available to permit the same to operate at full speed.

I claim:

1. A speed regulator for a continuous web roll-up device comprising a frame, web-supporting rollers, a dancer roll provided with bearings mounted for vertical sliding movement in said frame, said dancer roll being so positioned as to rest in a festoon of the continuous web formed between said web-supporting rollers, means for pulling the web of material through the festoon, a chain connected to one of said bearings, a shaft positioned at the top of said frame, a sprocket keyed to said shaft for engagement with said chain, a gear mounted on the shaft with said sprocket and rotatable therewith, a potentiometer connected to the means for pulling the web of sheet material through the festoon, a second shaft connected to said potentiometer, a second gear mounted on said second shaft for free rotation with respect thereto, a threaded sleeve mounted on said second shaft for rotation therewith, and a threaded hub on said second gear, the thread on the hub of the gear being in engagement with the thread on the sleeve when the second gear is in mesh with the first gear, the arrangement of the second gear with respect to the sleeve being such that the gear will rotate on the sleeve during the major portion of the path of travel of the dancer roll and will rotate the sleeve and said second shaft during the remainder of the path of travel of the dancer roll.

2. A speed regulator for a continuous web roll-up device comprising a frame, web-supporting rollers, a dancer roll provided with bearings mounted for vertical sliding movement in the frame, said dancer roll being so positioned as to rest in a festoon of the continuous web formed between said web-supporting rollers, means for pulling the web of material through the festoon, a chain connected to one of said bearings, a shaft positioned at the top of said frame, a sprocket keyed to said shaft for engagement with said chain, a gear mounted on the shaft with said sprocket and rotatable therewith, a potentiometer connected to the means for pulling the web of material through the festoon, a second shaft connected to said potentiometer, a second gear mounted on said second shaft for free rotation with respect thereto, a threaded sleeve mounted on said second shaft for rotation therewith, a threaded hub on said second gear, the thread on the hub of the gear being in engagement with the thread on the sleeve when the second gear is in mesh with the first gear, the arrangement of the second gear with respect to the sleeve being such that the gear will rotate on the sleeve during the major portion of the path of travel of the dancer roll and will rotate the sleeve and said second shaft during the remainder of the path of travel of the dancer roll, and means for holding said second shaft in fixed position during the time that said second gear is rotating freely with respect thereto.

3. A speed regulator for a continuous web roll-up device comprising a frame, web-supporting rollers, a dancer roll provided with bearings mounted for vertical sliding movement in the frame, said dancer roll being so positioned as to rest in a festoon of the continuous web formed between said web-supporting rollers, means for pulling the web of material through the festoon, a chain connected to one of said bearings, a shaft positioned at the top of said frame, a sprocket keyed to said shaft for engagement with said chain, a gear mounted on the same shaft with said sprocket and rotatable therewith, a speed regulator connected to the means for pulling the web of material through the festoon, a second shaft connected to said speed regulator, a second gear mounted on said second shaft for free rotation with respect thereto, a threaded sleeve mounted on said second shaft for rotation therewith, and a threaded hub on said second gear, the thread on the hub of the gear being in engagement with the thread on the sleeve when the second gear is in mesh with the first gear, the arrangement of the second gear with respect to the sleeve being such that the gear will rotate on the sleeve during a portion of the path of travel of the dancer roll and will rotate the sleeve and said second shaft during the remainder of the path of travel of the dancer roll.

4. A device for controlling the speed of movement of a continuous web comprising a frame, web-supporting rollers, a dancer roll provided with bearings mounted for vertical sliding movement in the frame, said dancer roll being so positioned as to rest in a festoon of the continuous web formed between said web-supporting rollers, means for moving the web of material through the festoon, a shaft positioned at the top of said frame, means connecting said shaft with said dancer roll so that vertical movement of the dancer roll will rotate said shaft, a gear mounted on said shaft for rotation therewith, a potentiometer connected to the means for moving the material through the festoon, a second shaft connected to said potentiometer, a second gear mounted on said second shaft for free rotation with respect thereto, said second gear being in mesh with said first gear, means mounted on said second shaft for permitting said second gear to rotate freely with respect to said second shaft during a portion of the path of travel of said dancer roll and to rotate said second shaft with said second gear during the remainder of the portion of travel of the dancer roll.

5. A device for controlling the speed of movement of a continuous web comprising a frame, web-supporting rollers, a dancer roll so positioned as to rest in a festoon of the continuous web formed between said web-supporting rollers, means for moving the web of material through the festoon, a shaft positioned at the top of said frame, means connecting said shaft to said dancer roll in such manner that vertical movement of the dancer roll will rotate said shaft, a gear mounted on the same shaft for rotation therewith, a speed regulator connected to the means for moving the web of material through the festoon, a second shaft connected to said speed regulator, a second gear mounted on said second shaft for free rotation with respect thereto, said second gear being in mesh with said first gear, and means on said second shaft to permit said second gear to rotate freely with respect thereto during a portion of the path of travel of said dancer roll and to rotate said second shaft and speed regulator with said second gear during the remainder of the path of travel of the dancer roll.

6. A device for controlling the speed of movement of a continuous web comprising a frame, web-supporting rollers, a dancer roll provided with bearings mounted for vertical sliding movement in the frame, said dancer roll being so positioned as to rest in a festoon of the continuous web formed between said web-supporting rollers, means for moving the web of material through the festoon, a chain connected to one of said bearings, a shaft positioned at the top of said frame, a sprocket keyed to said shaft for engagement with said chain, a gear mounted on the shaft with said sprocket and rotatable therewith, a potentiometer connected to the means for moving the web of material through the festoon, a second shaft connected to said potentiometer, a second gear mounted on said second shaft for free rotation with respect thereto, a threaded sleeve mounted on said second shaft for rotation therewith, a threaded hub on said second gear, the thread on the hub of the gear being in engagement with the thread on the sleeve when the second gear is in mesh with the first gear, the arrangement of the second gear with respect to the sleeve being such that the gear will rotate on the sleeve during a portion of the path of travel of the dancer roll and will rotate the sleeve and said second shaft during the remainder of the path of travel of the dancer roll, and a counterweight for holding said second shaft against rotary movement while said second gear is rotating freely with respect thereto.

References Cited in the file of this patent

UNITED STATES PATENTS

| | | |
|---|---|---|
| 1,673,521 | Maas | June 12, 1928 |
| 1,683,318 | Waner | Sept. 4, 1928 |
| 1,773,709 | Daniels | Aug. 19, 1930 |
| 1,889,546 | Gater | Nov. 29, 1932 |